United States Patent
Pierre et al.

(10) Patent No.: US 6,744,162 B2
(45) Date of Patent: Jun. 1, 2004

(54) SAFETY LOCKING DEVICE FOR ELECTROMECHANICAL EQUIPMENT AND AIRCRAFT WHEEL BRAKE EQUIPPED THEREWITH

(75) Inventors: Girod Pierre, Paris (FR); Chico Philippe, Rueil-Malmaison (FR)

(73) Assignee: Messier-Bugatti, Velizy Villacoublay (FR)

(*) Notice: Subject to any disclaimer, the term of this patent is extended or adjusted under 35 U.S.C. 154(b) by 0 days.

(21) Appl. No.: 10/232,524

(22) Filed: Sep. 3, 2002

(65) Prior Publication Data

US 2003/0042802 A1 Mar. 6, 2003

(30) Foreign Application Priority Data

Sep. 3, 2001 (FR) .............................................. 01 11364

(51) Int. Cl.[7] ................................................ H02K 7/02
(52) U.S. Cl. ........................... 310/77; 310/93; 188/161; 188/163
(58) Field of Search ................................. 310/75 R, 76, 310/77, 92, 93, 94; 188/158, 161, 163

(56) References Cited

U.S. PATENT DOCUMENTS 2,809,309 A * 10/1957 Evans ........................ 310/77
4,102,444 A * 7/1978 Palme ....................... 188/72.1
5,949,168 A    9/1999 Dieckmann et al.

FOREIGN PATENT DOCUMENTS

DE    198 26 785 A1    12/1999

* cited by examiner

Primary Examiner—Dang Le
(74) Attorney, Agent, or Firm—Sughrue Mion, PLLC

(57) ABSTRACT

A safety locking device for electromechanical equipment provided with a rotating shaft, particularly an aircraft wheel brake with a safety locking device. The device comprises a first friction element connected rotationally to the shaft, and a second friction element immobile rotationally and extending opposite the first friction element. One of the two friction elements is able to move in translation, under the action of a controllable actuator, between a locking position and a release position. The locking and release positions correspond to successive angular positions of a selector able to move in rotation and connected in translation to the friction element able to move in translation. The selector is maintained in any one of its angular positions by a resilient member, while the actuator provides solely the passage of the selector from one angular position to the following one, and consequently passage from the locking position to the release position or vice-versa.

8 Claims, 3 Drawing Sheets

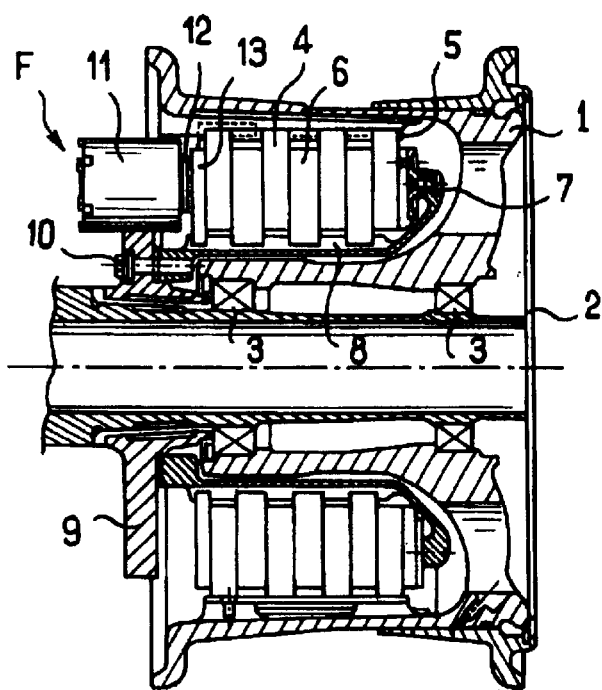
FIG_1
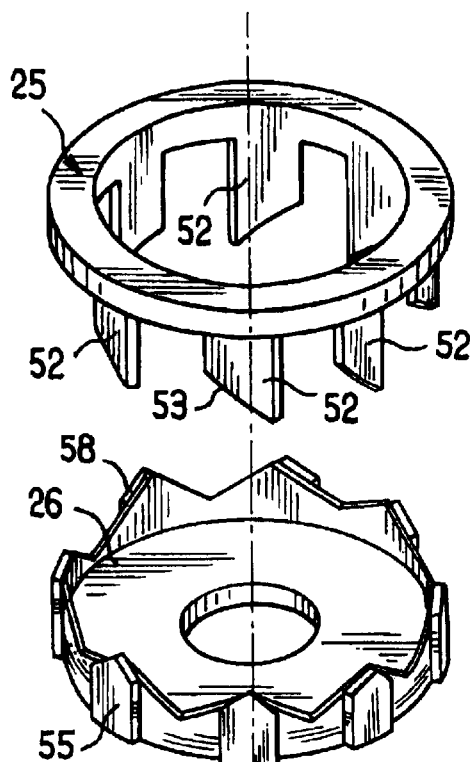
FIG_3
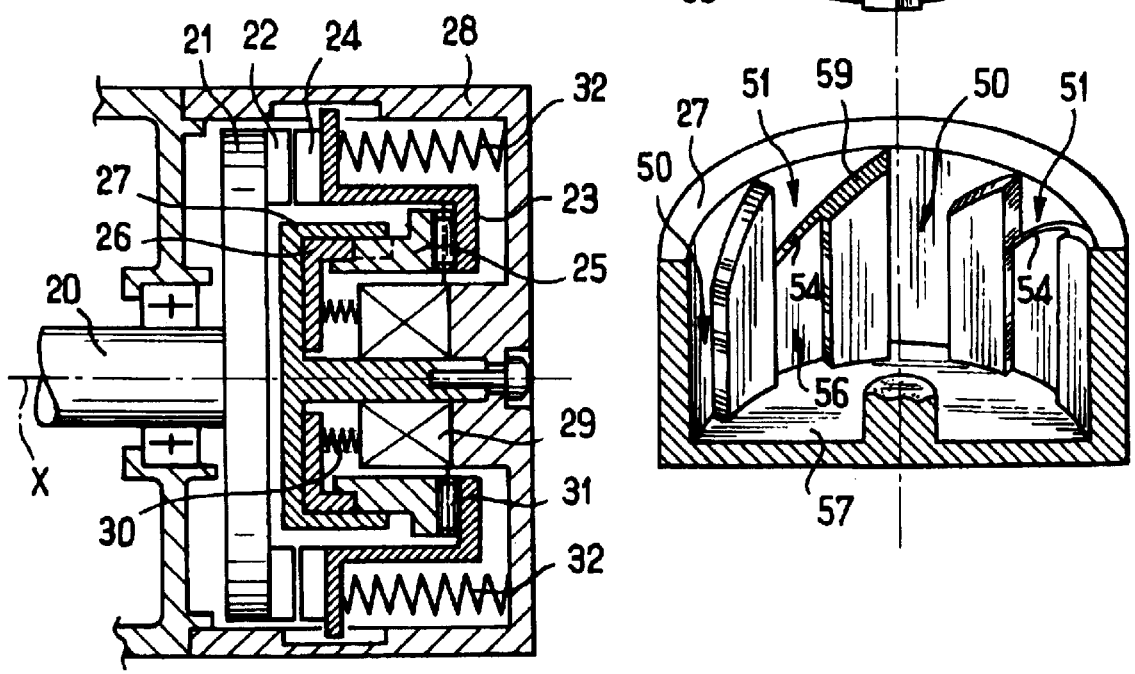
FIG_2

SAFETY LOCKING DEVICE FOR ELECTROMECHANICAL EQUIPMENT AND AIRCRAFT WHEEL BRAKE EQUIPPED THEREWITH

The invention concerns a safety locking device for electromechanical equipment.

BACKGROUND OF THE INVENTION

In many industrial fields, the machine components are actuated by an electric motor via a kinematic chain. In some applications, safety considerations make it necessary to lock the component or components in position when they are not being used.

To do this, it is known how to introduce an obstacle into a cavity produced in a rotating part of the kinematic chain, in order to cause a positive locking thereof. However, this makes it necessary to be able to stop the rotating part so that the cavity is in line with the obstacle, which is tricky to achieve. Moreover, under the effect of the release of the equipment or an attempt to operate it, the obstacle may be jammed in the cavity, which makes it difficult to withdraw it.

Motors are also known, equipped with a friction brake at the end of a shaft, in which a disc is integral with the motor shaft, whilst a second disc disposed opposite the first is able to move between a locking position in which it is pressed against the first disc with a view to locking the motor rotationally, and a release position in which the second disc is kept distant from the first disc, which allows free rotation of the motor. In general, the discs are held in one of the positions by the action of a resilient member, and in the other position by the constant action of an actuation member, for example an electromagnet, or a ram in which a chamber has been filled with oil and then closed off, acting counter to the resilient member.

In the event of failure of the actuation member (power supply failure with the electromagnet, or leakage in the case of the ram), the position which the actuation member made it possible to maintain is no longer guaranteed, and the locking device progressively slides towards the other position under the effect of the resilient means, which may prove dangerous. This is because the rotating shaft may be free to turn when it is deemed to be locked, or conversely the rotating shaft may be locked when it is deemed to be free to turn.

A few examples derived from the field of electric brakes for aircraft wheels will be given here. This type of brake comprises a stack of discs, some of which are able to move rotationally with the wheel (rotors), whilst the others, disposed in alternation with the first, are rotationally immobilised (stators). The brake comprises at least one electromechanical actuator provided with an electric motor and a mechanism arranged to press the discs with a view to generating a braking force on the wheel.

In order to immobilise the aircraft at rest, it is known how to keep the brake discs pressed, so that the wheel is locked in safety. To do this, in the context of an electric brake, it is advantageous to provide a means of locking the actuator, so that it suffices to actuate the actuator so that it presses the disc, and then to lock the actuator in this position by virtue of the locking means.

The use in this case of a system with an obstacle and a homologous cavity as a locking means is not satisfactory. This is because, when the aircraft is immobilised, the latter in general has just landed and therefore braked in a sustained fashion and the structure of the brake has therefore expanded under the effect of heat.

If the actuator is locked before the brake has cooled, the progressive contraction of the brake structure will result in increasing the pressing force on the discs. As a reaction, if the actuator is reversible, this increase in force may result in a jamming of the obstacle in the cavity which receives it, which may give rise to difficulties in releasing the finger.

Moreover, it is necessary to size the obstacle generously in order to prevent it breaking during an attempt to activate the actuator locked by the obstacle.

Likewise, the use of a friction disc system for locking the actuator is also not satisfactory. Such a system is certainly more tolerant to internal or external forces which tend to force the locking (for example an attempt to actuate the actuator whilst the locking system has been put in the locking position), but does not guarantee a high level of security.

This is because the actuator in general comprises an actuation member arranged so as to keep the friction discs of the actuator in a separated position when the actuator is active (and therefore electrically supplied), a spring pressing the discs against each other when the actuation member is not supplied in order to lock the actuator. A failure in power supply to the actuation member (or a failure in functioning thereof) would result in locking the actuator in an unwanted fashion in the position which it occupies at the time of the incident, making it inoperative.

There is also known, from the document U.S. Pat. No. 5,949,168, a brake for a motor vehicle with a locking device comprising a manoeuvring member used solely to make the locking device change from a release position to a locking position. The release position is held by means of a spring, whilst the locking position is held by means of a rotation of the motor in a direction tending to press the brake disc, having the effect of putting the locking device in irreversible jamming.

The locking device presented in this document is designed to allow automatic unjamming of the locking device under the effect of a rotation in the opposite direction to the motor, which puts the locking device back in the release position.

Such a system cannot be used in aeronautics just as it is, a field in which it is not desirable for an accidental rotation of the motor, whilst the locking device is in the locking position, to result in the release of the motor, and therefore in the release of the brake, which could prove dangerous.

OBJECTS AND SUMMARY OF THE INVENTION

The invention therefore aims to propose a safety locking device for electromechanical equipment, not requiring the continuous action of an actuation member for keeping the device in one or other of the locking or release positions, whilst being tolerant to an internal or external force which would tend to force the locking, without this force being able to change the locking device from the locked state to the free state.

The object of the invention is more precisely a safety locking device intended to equip electromechanical equipment which is provided with a shaft rotating about a rotation axis, the device comprising a first friction element rotationally connected to the said shaft and extending in a plane normal to the rotation axis of the said shaft, and a second friction element immobile with respect to rotation and extending opposite the first friction element, one of the two friction elements being able to move in translation along the said axis, under the action of controllable actuation means, between a locking position in which the two friction elements are pressed against one another by a resilient member and a release position in which the two friction elements are kept separated, the said actuation means not participating in the maintenance of one or other of the locking or release positions. According to the invention, the locking and release positions correspond to successive angular positions of a selector able to move in rotation and connected in translation to the friction element able to move in translation, the said selector being maintained in any one of its angular positions by the aforementioned resilient member, the controllable actuation means being arranged to provide the passage of the selector from one angular position to the following, and subsequently the passage of the friction element able to move in translation from one to the other of its locking and release positions.

Thus, the actuation means not being used to maintain one of the locking or release positions, they therefore no longer have to be supplied with power in a prolonged fashion in order to maintain the friction elements in one or other of their positions. Moreover, the use of friction elements, preferably with a positive obstacle, allows sliding under the effect for example of an attempt to activate the electromechanical equipment, or in the case of unwanted increase in the external force applied to the actuator.

In addition, the two positions are held by the resilient member, and an accidental rotation of the motor does not have the effect of causing the device to pass from the locking position to the release position.

It should be noted then that in the document U.S. Pat. No. 5,949,168 the locking and release positions correspond to alternate angular positions, the locking and release positions of the locking device according to the invention correspond to successive angular positions.

According to a preferred arrangement, the selector comprises a locating member which is received in hollows in a ring, the hollows being disposed circumferentially on the ring and being organised in a first and second series of alternating hollows, the hollows in the first series having a depth such that the friction elements are in contact before the locating member abuts on the bottom of the said hollows, and the hollows in the second series having a depth such that the locating member abuts on the bottom of the said hollows before the friction elements are in contact.

The locking and release positions are then simply obtained by placing the locating member in one or other of the series of hollows in the ring.

Advantageously, the controllable actuation means comprise a pusher which is able to move axially and which is arranged to push the selector counter to the elastic member so as to release the locating member from the hollow in the ring in which it is engaged, the selector and/or the pusher having a cam profile which causes a rotation of the said selector so as to cause the movement of the locating member towards an adjacent hollow when the said pusher returns to its initial position.

Thus, by a simple translation movement of the pusher which can easily be controlled, the concomitant rotation of the selector is brought about.

According to an advantageous arrangement, the cam profile is carried by the pusher and acts on the free end of the locating member.

According to a particular embodiment, the locating member comprises a plurality of teeth extending towards the ring, the teeth being in number half the number of hollows in the ring.

Advantageously, an additional return member cooperates with the pusher in order to return the latter to its initial position after its actuation.

The controllable actuation means preferably comprise an electromagnet serving to actuate the pusher, the said electromagnet being powered only to pass from a locking position to a release position of the friction element able to move in translation, or vice-versa.

Another object of the invention is a brake for an aircraft wheel, comprising a stack of discs comprising rotors connected with respect to rotation to the wheel, and stators fixed with respect to rotation and arranged in alternation in the stack with the rotors, the said brake comprising at least one electromechanical actuator arranged to press the stack of discs with a view to exerting an electromechanical braking force on the wheel. According to the invention, the electromechanical actuator is equipped with a safety locking device having at least one of the aforementioned characteristics, associated with a rotating shaft of the kinematic chain of the said actuator.

BRIEF DESCRIPTION OF THE DRAWINGS

Other characteristics and advantages of the invention will emerge more clearly in the light of the following description of a particular non-limiting embodiment of the invention. Reference will be made to the accompanying drawings and to the figures, amongst which:

FIG. 1 is a view in section of an electric aircraft wheel brake, an electromechanical actuator of which is provided with a safety locking device according to the invention;

FIG. 2 is a view in partial section of part of the actuator illustrated in FIG. 1, provided with a safety locking device according to the invention;

FIG. 3 is a view in partial exploded perspective of FIG. 2 showing certain parts of the means of actuating the safety locking device;

MORE DETAILED DESCRIPTION

Figure 4:
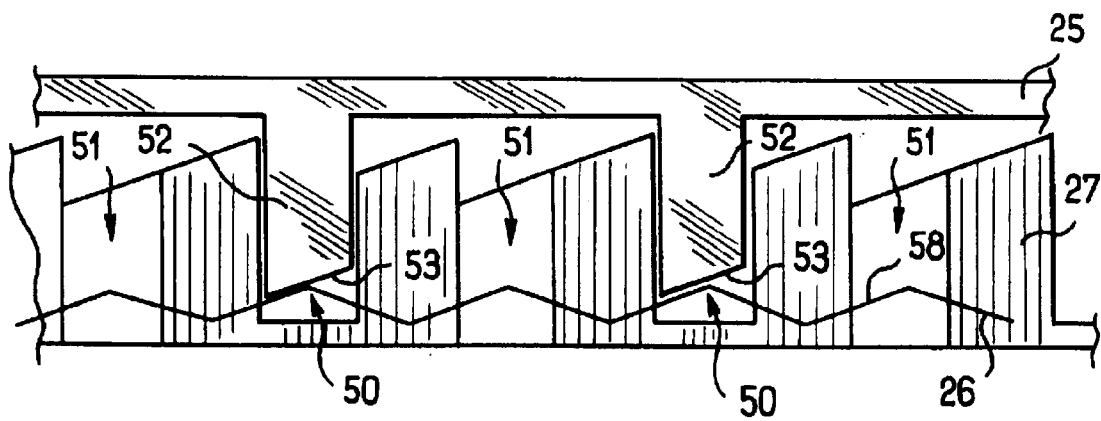
FIGS. 4 to 7 are partial developed views of the locking device illustrated in FIG. 3, in various positions of the safety locking members.

With reference to FIG. 1, and in a manner known per se, the aircraft wheel 1 is mounted rotationally on a shaft 2 by means of bearings 3. The wheel 1 is equipped with a brake F comprising a stack of discs composed of rotors 4 which are able to move in rotation with the wheel 1 by virtue of a peripheral keying 5, and stators 6 which are disposed in alternation with the rotors 4 and which are rotationally connected to a torsion tube 7 by means of an internal keying 8. The torsion tube 7 is itself connected to a ring 9 by screws 10. The ring 9 is slipped on the shaft 1, and rotationally stopped vis-à-vis the shaft via a means which is not shown here, so that the stators 6 are also rotationally immobilised.

The ring 9 carries circumferentially arranged electromechanical actuators 11, only one of which is shown here. These actuators have a pusher 12 actuated by an electric motor, not visible here, in order to press the stack of discs by means of a pressure plate 13.

In this type of brake, as mentioned in the introductory part of the description, it is advantageous to provide a means for safety locking of the actuator, in order to fulfil the parking brake function.

To this end, and as can be seen in FIG. 2, one of the shafts 20 of the kinematic chain of the actuator 11 is provided with a safety locking device according to the invention, comprising a disc 21 rotationally connected to the shaft 20 and carrying a friction lining 22. Opposite the disc 21 there is a lining holder 23, which is provided with a lining 24 and which is immobile rotationally and mobile translationally along the axis X of the shaft 20 counter to the springs 32, which tend to return the lining holder 23 towards the disc 21. The presence of linings in no way constitutes an obligation, and it would be possible to provide direct contact between the two friction elements, as is well known to persons skilled in the art.

The lining holder 23 is associated with actuation means comprising a selector 25 which is able to move both in rotation and in translation along the axis X. The selector 25 is subjected to the action of a pusher 26 which is guided in translation by a ring 27 connected to the casing 28 of the device, and which is manoeuvred by an electromagnet 29 counter to return springs 30.

When the pusher 26 is manoeuvred, it forces the selector 25 against the lining holder 23 by means of a needle (or roller) bearing 31.

As can be seen more clearly in FIG. 3, the ring 27 has a first series of peripheral hollows 50 extending as far as the bottom 57 of the ring 27 and, in alternation, a second series of hollows 51, having a lesser depth delimited by a rim 54 which extends the top edge 59 of the adjacent protuberance delimiting a deep hollow 50.

The selector 25, for its part, comprises teeth 52 circumferentially distributed so as to extend towards the hollows of the ring 27, the teeth 52 being able to engage either in the series of hollows 50 or in the series of hollows 51 in the ring 27. When the teeth 52 are engaged in the series of hollows 51, their free end 53 comes into abutment against the rim 54 of the hollows 51. These characteristics define two distinct angular positions of the selector 25 with respect to the ring 25, each of these positions being associated with one of the release or locking positions of the device, as will be more amply explained below.

The pusher 26 has steps 55 which fit in the hollows 50 in the ring 27, as well as in partially hollowed-out parts 56 of the ring 27 extending the hollows 51 towards the bottom 57 of the ring 27. The pusher 26 also has a cam profile 58 intended to cooperate with the free end 53 of the teeth 52 of the selector 25.

The functioning of the actuation means will now be explained in relation to FIGS. 4 to 7.

FIG. 4 depicts the selector 25 in an angular position corresponding to the engagement of the teeth 52 of the selector 25 in the deep hollows 50. The pusher 26, of which only the cam profile 58 has been depicted, is held in abutment against the bottom 57 of the ring 27. When the selector 25 and the pusher 26 are in this position, the linings 22 and 24 carried respectively by the disc 21 and the lining holder 23 are in contact and are kept pressed against each other by the springs 32. The selector 25 then has an axial operating clearance between the pusher 26 and the needle bearing 31, which is itself in abutment against the lining holder 23. There is a direct correspondence between the angular position of the selector 25 defined by the engagement of the teeth 52 in the hollows 50 in the ring 27, and the locking of the shaft 20 with respect to rotation. It will also be remarked that the free end (edge 53) of the teeth 52 does not touch the bottom of the hollows 50, which happens to be the bottom 57 of the ring 27.

Figure 5:
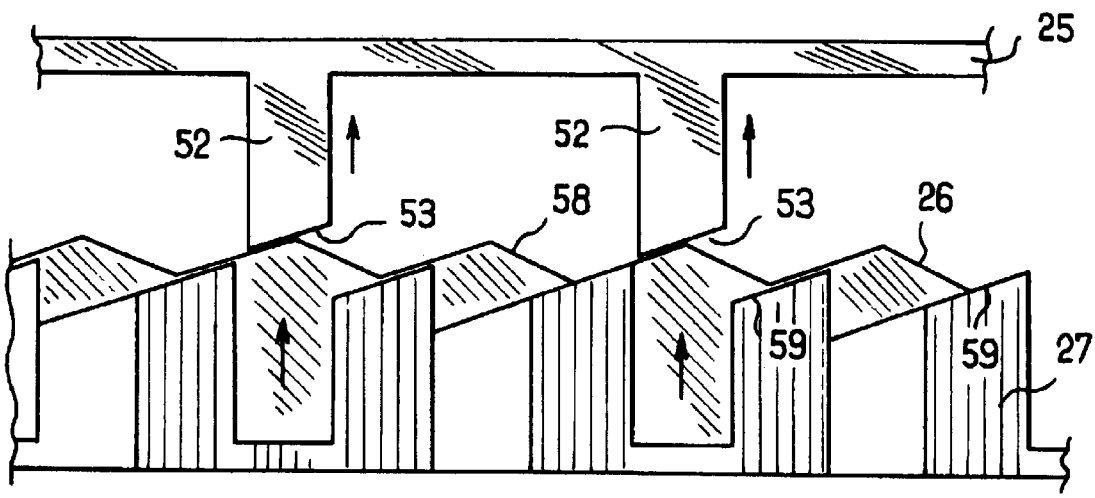

In FIG. 5, the pusher 26 has been actuated counter to springs 30 by the electromagnet 29, which attracts it towards it. The pusher 26 then pushes the selector 25, until the teeth 52 come out of the deep hollows 50, as has been illustrated. At the same time, the selector 25 pushes the lining holder 23 by means of the needle bearing 31, which has the effect of separating the linings 22 and 24, and therefore once again allowing free rotation of the shaft 20. This then corresponds to the so-called release position.

Figure 6:
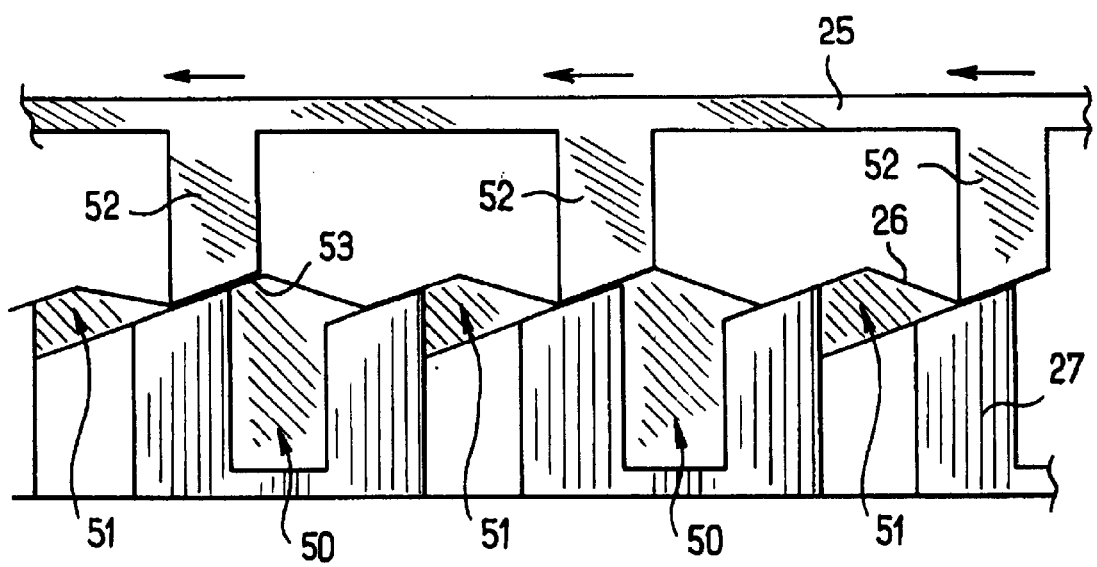

Given the shape of the cam profile 58 of the pusher 26 on which the free ends 53 of the teeth 52 are in abutment, the teeth 52 will have a tendency to slide obliquely, which will cause a rotation of the selector 25 as far as the position illustrated in FIG. 6, in which the teeth 52 are then held in a hollow of the cam profile 58 of the pusher 26.

In this position, the action of the electromagnet is then released, which causes the pusher 26 to return to the bottom of the ring 27 under the effect of the return springs 30.

Figure 7:
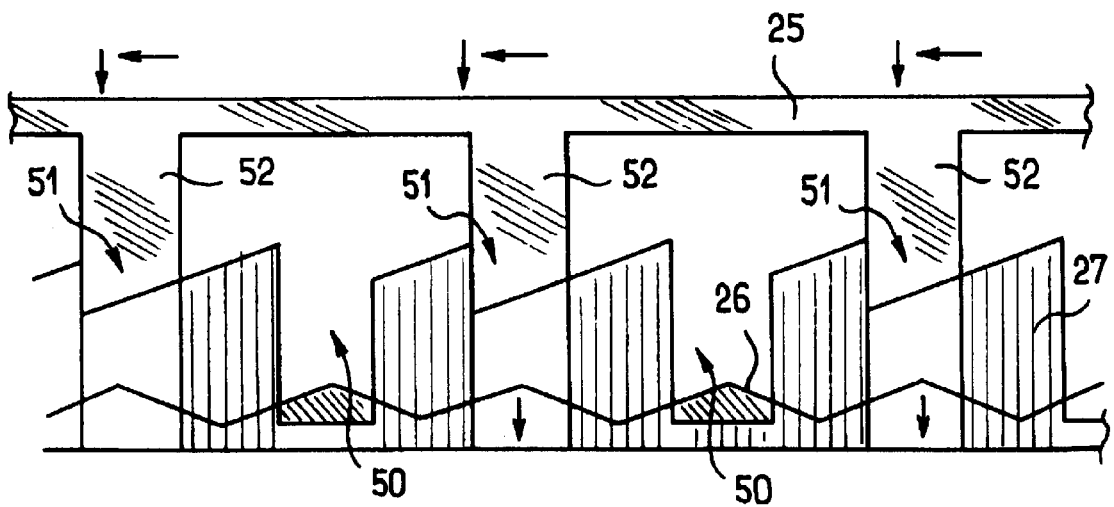

The free end 53 of the teeth 52 then slides on the end rim 59 of the separations defining the hollows 50 and 51, and comes to be housed in the hollow 51 in abutment against the bottom 54 of the said hollows, as illustrated in FIG. 7, under the effect of the springs 32, which press the lining holder 23 against the selector 25 via the needle bearing 31.

This angular position of the selector 25 with respect to the ring 27 corresponds to an axial position of the selector 25 which moves the lining holder 23 away from the disc 21, so that the linings 22, 24 are no longer in contact.

Here too, there is a direct correspondence between the angular position of the selector 25 defined by the engagement of the teeth 52 in the hollows 51, and the rotational release of the shaft 20.

In order to go to the other position again, which is the locking position, it suffices once again to supply the electromagnet in order to attract the pusher 26, which will make the teeth 52 emerge from the hollows 51. The selector 25 will then turn under the effect of the cam profile of the pusher 26, and then, when the electromagnet is no longer supplied, the selector will finish turning so that its teeth 52 are housed in the deep hollows 50 under the effect of the springs 32.

It will therefore be noted that the electromagnet 29 serves only to move the selector from one angular position to the following one, and not to hold the selector, and therefore the lining holder, in one or other of the locking or release positions. The angular positions correspond alternately to the locking position and to the release position taken by the disc 21 and the lining holder 23. These two elements are kept in one or other of the locking or release positions by the springs 32, which also provide the pressure of the linings 22, 24 against one another in the locking position.

The invention is not limited to the particular embodiment which has just been described, but quite the contrary is intended to cover any variant which would come within the scope of the invention as defined by the claims.

In particular, although a description has been given of a selector whose locating device consists of teeth, the locating device could consist of one or more fingers able to extend radially. In a variant, the ring can be mounted in rotation, whilst the selector can simply be moved in translation, the rotation of the ring then being obtained by a cooperation with a cam profile of the selector or pusher.

Although it has been indicated that the controllable actuation means comprise an electromagnet, it will be possible to envisage any other known actuation means, such as an electric motor or a ram.

Although it has been indicated that the movable friction element is not connected to the shaft, it will be possible to produce a safety locking device in which the axially movable friction element is connected rotationally to the shaft.

Although, finally, it has been indicated that the friction elements are in the form of linings contacting each other on a plane normal to the axis X of the shaft 20, it will also be possible to envisage homologous conically shaped linings. It will also be possible to envisage a device with radial linings, of the drum and jaw type, the jaws being actuated by the selector via a gear or any other suitable kinematics.

What is claimed is:

1. A safety locking device intended to equip an electromechanical equipment which is provided with a shaft rotating about a rotation axis, the device comprising a first friction element rotationally connected to the said shaft and extending in a plane normal to the rotation axis of the said shaft, and a second friction element immobile with respect to rotation and extending opposite said first friction element, one of the two friction elements being able to move in translation along the said axis, under the action of controllable actuation means, between a locking position in which the two friction elements are pressed against one another by a resilient member and a release position in which the two friction elements are kept separated, the said actuation means not participating in the maintenance of one or other of the locking or release positions, wherein the locking and release positions correspond to successive angular positions of a selector able to move in rotation and connected in translation to the friction element able to move in translation, the said selector being maintained in any one of its angular positions by the aforementioned resilient member, the controllable actuation means being arranged to provide the passage of the selector from one angular position to the following, and subsequently the passage of said friction element able to move in translation from one to the other of its locking and release positions.

2. A safety device according to claim 1, wherein the selector comprises a locating member which is received in hollows in a ring, the hollows being disposed circumferentially on the ring and being organised in a first and second series of alternating hollows, the hollows in the first series having a depth such that the friction elements are in contact before the locating member abuts on the bottom of the said hollows, and the hollows in the second series having a depth such that the locating member abuts on the bottom of the said hollows before the friction elements are in contact.

3. A safety device according to claim 2, wherein the controllable actuation means comprise a pusher which is able to move axially and which is arranged to push the selector counter to the elastic member so as to release the locating member from the hollow in the ring in which it is engaged, the selector and/or the pusher having a cam profile which causes a rotation of the said selector so as to cause the movement of the locating member towards an adjacent hollow when the said pusher returns to its initial position.

4. A safety device according to claim 3, wherein the cam profile is carried by the pusher and acts on the free end of the locating member.

5. A safety device according to claim 2, wherein the locating member has a plurality of teeth extending towards the ring, the teeth being in number half that of the number of hollows in the ring.

6. A safety device according to claim 3, wherein an additional return member cooperates with the pusher in order to return the latter to its initial position after its actuation.

7. A safety device according to claim 3, wherein the controllable actuation means comprise an electromagnet serving to actuate the pusher, the said electromagnet being supplied with power only to pass from a locking position to a release position of the friction element able to move in translation, or vice-versa.

8. A brake for an aircraft wheel, comprising a stack of discs comprising rotors connected with respect to rotation to the wheel, and stators fixed with respect to rotation and arranged in alternation in the stack with the rotors, the said brake comprising at least one electromechanical actuator arranged to press the stack of discs with a view to exerting an electromechanical braking force on the wheel, wherein the electromechanical actuator is equipped with a safety locking device according to claim 1, associated with a rotating shaft of a kinematic chain of the said actuator.

* * * * *